United States Patent
Nishibayashi et al.

(10) Patent No.: US 10,484,947 B2
(45) Date of Patent: Nov. 19, 2019

(54) WIRELESS COMMUNICATION DEVICE AND WIRELESS COMMUNICATION SYSTEM

(71) Applicant: KABUSHIKI KAISHA TOSHIBA, Tokyo (JP)

(72) Inventors: Yasuyuki Nishibayashi, Kanagawa (JP); Yusuke Doi, Kanagawa (JP); Takafumi Sakamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 589 days.

(21) Appl. No.: 15/049,460

(22) Filed: Feb. 22, 2016

(65) Prior Publication Data
US 2016/0278010 A1    Sep. 22, 2016

(30) Foreign Application Priority Data
Mar. 20, 2015  (JP) ................. 2015-058449

(51) Int. Cl.
*H04W 52/02* (2009.01)
*H04W 40/08* (2009.01)

(52) U.S. Cl.
CPC ........ *H04W 52/0219* (2013.01); *H04W 40/08* (2013.01); *Y02D 70/00* (2018.01);
(Continued)

(58) Field of Classification Search
CPC ......... H04W 52/0219; H04W 52/0261; H04W 52/0277; H04W 52/0209; H04W 52/0216;
(Continued)

(56) References Cited

U.S. PATENT DOCUMENTS

| | | | |
|---|---|---|---|
| 8,724,602 B2 * | 5/2014 | Tanaka ............ | G06F 1/3203 370/338 |
| 2005/0094588 A1 * | 5/2005 | Wentink ............ | H04W 40/10 370/315 |

(Continued)

FOREIGN PATENT DOCUMENTS

| | | |
|---|---|---|
| JP | 2011-13765 A | 1/2011 |
| JP | 2013-30871 A | 2/2013 |

*Primary Examiner* — Habte Mered
(74) *Attorney, Agent, or Firm* — Finnegan, Henderson, Farabow, Garrett & Dunner, L.L.P.

(57) ABSTRACT

According to an embodiment, a wireless communication device includes a determiner, and an executor. The determiner is configured to determine whether the wireless communication device can continue operation by a stored electric power in which remaining capacity changes according to operation of the wireless communication device for a predetermined period, based on information including an operation timing associated with a cycle in which a management server. The executor is configured to execute an operation in which the data is transmitted and received between the other wireless communication device and the management server via the wireless communication device when the wireless communication device is able to continue the operation, and otherwise, cause the wireless communication device to move into intermittent operation and causes the other communication device to transmit the data to the management server not via the wireless communication device.

8 Claims, 11 Drawing Sheets

(52) U.S. Cl.
CPC ............ *Y02D 70/144* (2018.01); *Y02D 70/22* (2018.01); *Y02D 70/324* (2018.01)

(58) Field of Classification Search
CPC ......... H04W 52/0251; H04W 52/0254; H04W 40/08; Y02D 70/22; Y02D 7/324; Y02D 70/00; Y02D 70/144
See application file for complete search history.

(56) References Cited

U.S. PATENT DOCUMENTS

| | | | |
|---|---|---|---|
| 2006/0128351 A1* | 6/2006 | Hassan | H04W 52/0283 455/343.4 |
| 2007/0291673 A1* | 12/2007 | Demirhan | H04W 52/0216 370/311 |
| 2008/0298287 A1* | 12/2008 | Martinez-Perez | H04W 72/1247 370/311 |
| 2013/0250812 A1* | 9/2013 | Rath | H04W 24/02 370/255 |
| 2014/0293855 A1* | 10/2014 | Serizawa | H04W 52/0219 370/311 |
| 2015/0003309 A1* | 1/2015 | Mukherjee | H04W 40/10 370/311 |
| 2015/0067017 A1* | 3/2015 | Shah | H04L 65/4084 709/202 |
| 2015/0148965 A1* | 5/2015 | Lemire | G05B 15/02 700/276 |
| 2016/0044608 A1* | 2/2016 | Denic | H04W 52/0219 370/315 |
| 2016/0198404 A1* | 7/2016 | Tsiatsis | H04W 52/0248 455/507 |
| 2016/0234786 A1* | 8/2016 | Gaja | H04W 52/0261 |
| 2017/0094579 A1* | 3/2017 | Kurihara | H04W 4/04 |

* cited by examiner

| | DATA ITEM | DATA LENGTH | PERIODIC (INTERVAL) | NON-PERIODIC (INSTANTANEOUS/ TRIGGER) |
|---|---|---|---|---|
| CONTROL | – | – | – | – |
| MONITORING | INDIVIDUAL SETTING OR RE-SETTING OF DEVICE | VARIABLE | – | ○ |
| | DEVICE DIAGNOSTIC RESULT | VARIABLE | – | ○ |
| | TROUBLE-SHOOTING OF DEVICE | VARIABLE | – | ○ |
| | VARIOUS MEASUREMENT VALUES SUPPLIED BY DEVICE | FIXED | ○ | ○ |
| | INTEGRITY AND STATUS OF DEVICE | FIXED | ○ | ○ |
| | OTHER VARIOUS APPLICATIONS | – | – | – |

FIG.6

|  | DATA LENGTH EXAMPLE | DATA COLLECTION CYCLE EXAMPLE |
|---|---|---|
| PROCESS MANUFACTURING | SEVERAL TENS OF BYTES | EVERY SEVERAL TENS OF SECONDS |
| FACTORY MANUFACTURING | SEVERAL BYTES | EVERY SEVERAL TEN MILLISECONDS |

FIG.7

| POWER SOURCE | REMAINING CAPACITY | ROLE IN COMMUNICATION PATH | OPERATION TIMING | | POWER CONSUMPTION AMOUNT | GENERATED ELECTRIC POWER AMOUNT |
|---|---|---|---|---|---|---|
| AC POWER SOURCE | – | RECEIVER | DATA LENGTH | | COMMUNICATION: $\alpha 1$ (A) | – |
| | | | PROCESSING FREQUENCY | | | |
| | | RELAY DEVICE | DATA LENGTH | | COMMUNICATION: $\alpha 2$ (A) | – |
| | | | PROCESSING FREQUENCY | | | |
| | | TRANSMITTER | DATA LENGTH | | COMMUNICATION: $\alpha 3$ (A) | – |
| | | | PROCESSING FREQUENCY | | | |
| BATTERY | X (Wh) | RECEIVER | DATA LENGTH | | COMMUNICATION: $\beta 1$ (A) | Y1 (A) |
| | | | PROCESSING FREQUENCY | | | |
| | | RELAY DEVICE | DATA LENGTH | | COMMUNICATION: $\beta 2$ (A) | Y2 (A) |
| | | | PROCESSING FREQUENCY | | | |
| | | TRANSMITTER | DATA LENGTH | | COMMUNICATION: $\beta 3$ (A) | Y3 (A) |
| | | | PROCESSING FREQUENCY | | | |

FIG.8

|  | WIRELESS DEVICE (BATTERY OPERATION) | GW DEVICE (AC OPERATION) | MANAGEMENT SERVER | PLC·DCS |
|---|---|---|---|---|
| POWER SOURCE/ REMAINING CAPACITY | ○ | ○ | – | – |
| ROLE IN COMMUNICATION PATH | ○ | ○ | – | – |
| OPERATION TIMING (APPLICATION) | – | – | ○ | ○ |
| POWER CONSUMPTION AMOUNT | ○ | – | – | – |
| GENERATED ELECTRIC POWER AMOUNT | ○ | – | – | – |

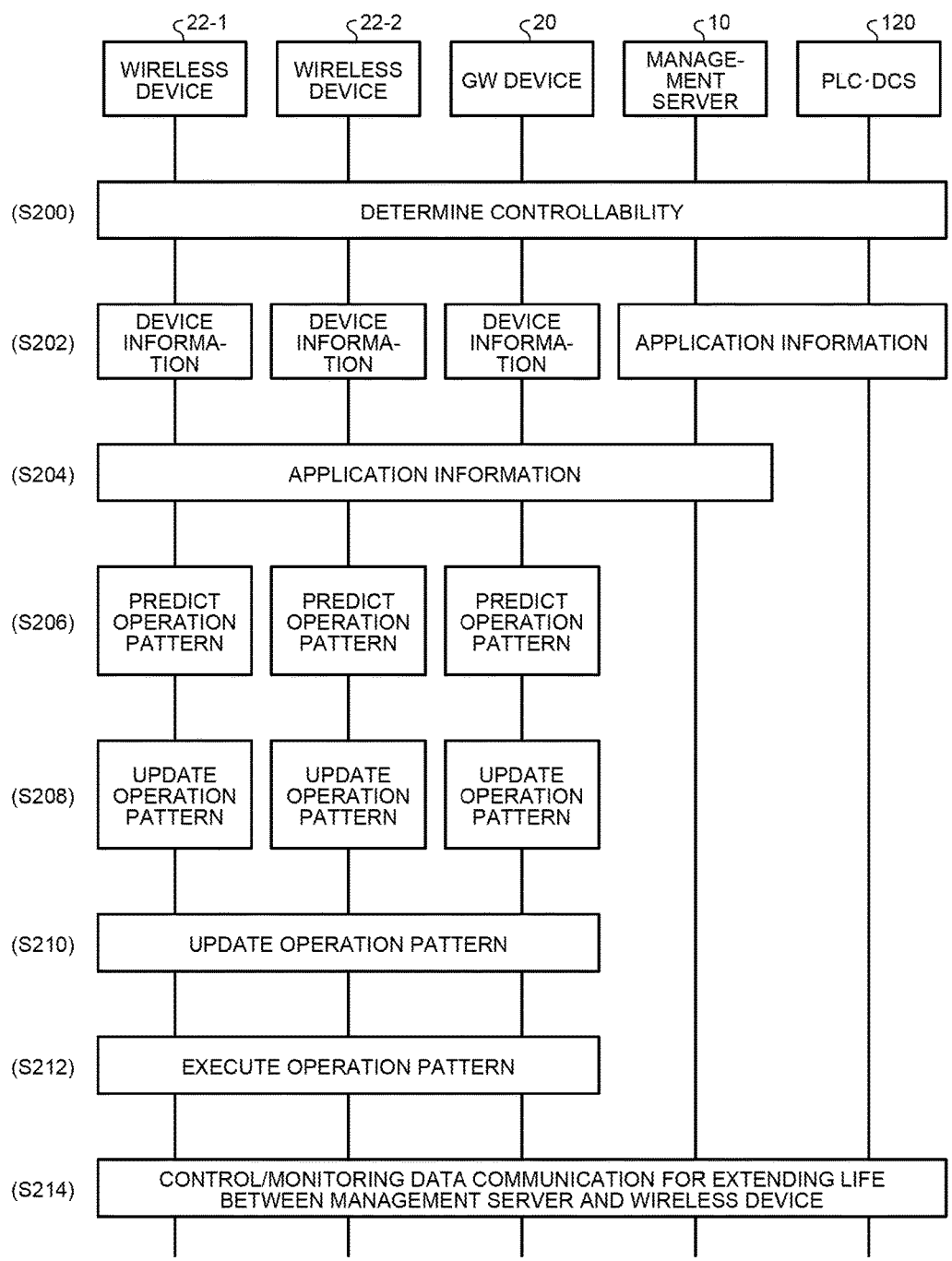

WIRELESS COMMUNICATION DEVICE AND WIRELESS COMMUNICATION SYSTEM

CROSS-REFERENCE TO RELATED APPLICATION

This application is based upon and claims the benefit of priority from Japanese Patent Application No. 2015-058449, filed on Mar. 20, 2015; the entire contents of which are incorporated herein by reference.

FIELD

Embodiments described herein relate generally to a wireless communication device and a wireless communication system.

BACKGROUND

There is, on one hand, a backbone system for implementing applications in various regions, such as energy, industry, health care, public, and traffic. On the other hand, structuring of a sub-system provided with a sensor device is advancing for expanding a scope of data utilization. In the sensor device, when operated by a battery, extending the life of the battery contributes to the life of an entire system.

In an actual system, an upper-system server and a lower-system wireless communication device are configured in multivendor environment in some cases. In this case, appropriateness of performing an operation update after starting the operation, and granularity of data treated may differ depending on implementation in hardware/software (HW/SW).

BRIEF DESCRIPTION OF THE DRAWINGS

FIG. 6 is a chart related to control/monitoring data in an application of the management server;

FIG. 7 is a chart related to life property of a wireless communication device of an embodiment;

FIG. 8 is a chart illustrating parameters related to each of the devices;

FIG. 15 is a diagram illustrating an exemplary operation sequence of the wireless communication system 1.

DETAILED DESCRIPTION

Figure 1:
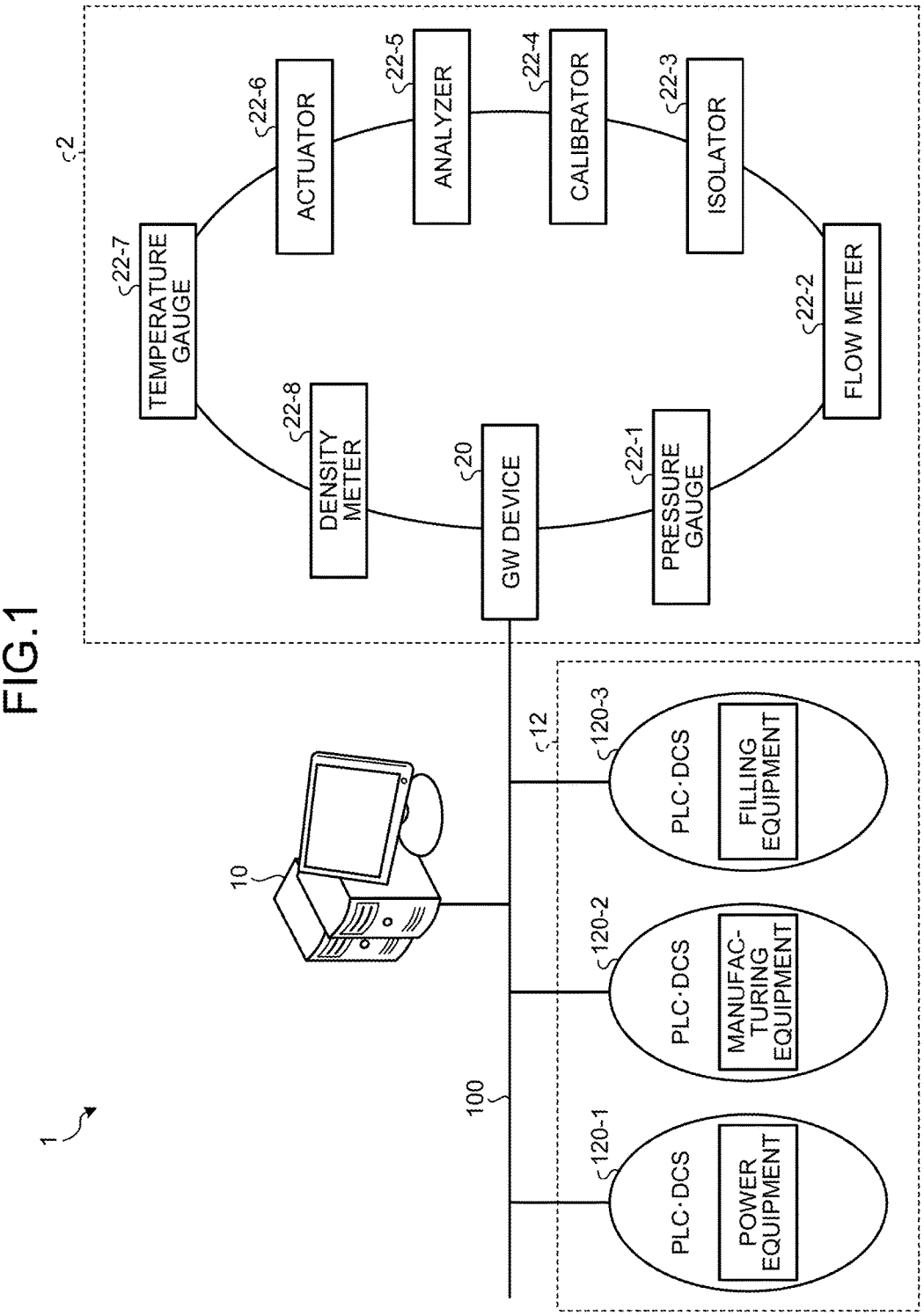
FIG. 1 is a diagram illustrating an exemplary configuration of a wireless communication system according to an embodiment.

According to an embodiment, a wireless communication device is configured to operate by electric power supplied from a storage battery so that data is received and transmitted between another wireless communication device and a management server that manages the data. The wireless communication device includes a first acquirer, a second acquirer, a first determiner, and an executor. The first acquirer is configured to acquire first information that includes an operation timing associated with a cycle in which the management server manages the data. The second acquirer is configured to acquire second information that includes a stored electric power amount in which remaining capacity changes according to operation of the wireless communication device. The first determiner is configured to determine whether the wireless communication device is able to continue operation by the stored electric power for a predetermined period, based on the first information and the second information. The executor is configured to execute a first operation pattern in which the data is transmitted and received between the other wireless communication device and the management server via the wireless communication device when the first determiner determines that the wireless communication device is able to continue the operation, and execute a second operation pattern in which the wireless communication device moves into intermittent operation and a third operation patter when the first determiner determines that the wireless communication device is not able to continue the operation, the second operation pattern the wireless communication device moves into intermittent operation. The third operation pattern causes the other communication device to change a communication path so that the data is transmitted from the other communication device to the management server without passing through the wireless communication device.

Hereinafter, a background of a wireless communication system according to an embodiment will be described. In considering how improved management efficiency achieved by utilizing information and communication technology (ICT) may be linked to profits, a concept of marginless as a baseline that minimizes the waste has been advancing in various areas.

For example, supply chain management traces a flow of device to make the cost marginless and sets achieving the maximum throughput with a fixed cost as its target index. Furthermore revenue management traces demand for each of price zones related to device and service to make acquisition opportunity and acquisition profit marginless, and achieving higher efficiency in throughput separately in price/demand is a target index.

These approaches to marginless are implemented specifically in a combination of application/system platform/device management corresponding to individual prerequisites in various areas of, for example, energy, industry, health care, public and traffic.

In an energy area, there are systems called a smart grid and smart community. These systems include electricity infrastructure, industries (commerce and manufacturing)

and households. In electricity infrastructure, a utility company such as an electric power company owns a facility. Investment, adjustment and management are performed in order to achieve stable energy supply. In industry (commerce and manufacturing), facilities are owned by an owner of a building or a factory. According to a scale of energy amount contracted with a utility company, electric power consumers are classified into special high voltage consumers, high voltage consumers, or the like.

According to the Electricity Business Act in Japan, contracted electricity of 2,000 kW or more is classified into special high voltage consumers, contracted electricity of 50-2,000 kW is classified into high voltage consumers. High voltage consumers are further classified into small-volume and large-volume consumers. The household is a low-voltage electric light consumer, contracted electricity being less than 50 kW. Generally, an industry (commerce and manufacturing) has a large-scale facility and a plurality of floors, whereas a household has a small-scale facility and often has a single device for a separate purpose.

Furthermore, areas of electricity include usages such as a power station (load dispatching station) as a center, and electricity infrastructure, industry (commerce and manufacturing), and households. As an electricity infrastructure owned by a utility company such as an electric power company, there are photovoltaic (PV) classified into renewable energy (energy sources including solar power generation system, a wind power generation system, hydraulic power generation system), and a battery energy storage system (BESS) classified into energy storage (energy storage including storage battery system or the like), under a micro energy management system (μEMS) and supervisory control and data acquisition (SCADA).

On consumer's ends including an industry (commerce and manufacturing) or a household, exist a consumer EMS as a center, a smart meter, a submeter, PV, BESS, and an electric vehicle (EV). The consumer EMS for a building as a commercial field is referred to as a building energy management system (BEMS). The consumer EMS for a factory as an industrial field is referred to as a factory energy management system (FEMS). The consumer EMS for a household is referred to as a home energy management system (HEMS).

With renewable energy sources including PV and wind power generation, and an energy storage including BESS, an inverter/power conditioning system (PCS) that converts input/output electric power (alternating current-direct current, direct current-alternating current, direct current-direct current, alternating current-alternating current) is connected. Conceptually, the PCS belongs to an inverter. When connected to a power source system (power generation/power storage) including PV/BESS, the system is referred to as a PCS, as it rectifies (performs power conditioning) with a collaborating function with a utility power system or the like.

Specifically, an energy management system (EMS) is arranged at a central load dispatching station of an electric power company (for controlling amount of generation of nuclear power, thermal power, and hydraulic power). Under this, a plurality of μEMS is arranged for controlling a power transmission and distribution network. The EMS further manages a plurality of facilities of the consumers. In a consumer's premises, electric power consumption systems including air conditioning and lighting are provided with a general-purpose inverter, and power source systems including BESS/PV are provided with PCS. Conventionally, a power converter corresponding to the PCS mainly uses one-way communication including firmware remote updating. Nowadays, smart grids and smart communities have been emerging, creating a trend of producing two-way communication including controlling.

A local controller, for example, efficiently performs electric power control (monitoring control) of a plurality of BESSs/PVs installed internally, makes them appear as one assembly, while mounting various types of standard protocol/interface systems. In addition to collaboration between an upper EMS or a local controller and an inverter/PCS, there are forms of collaboration between each of the inverters/PCSs. Examples of the forms include electric power sharing within power receiving capacity (autonomous cooperation), synchronous operation of a plurality of power sources (autonomous cooperation), and continued operation at blackout (autonomous cooperation).

Specifically, electric power sharing includes functions such as virtualized collaboration, degeneration operation, and efficiency optimization operation. In the virtualized collaboration, a master inverter/PCS obtains total power requirement, distributes an electric power amount to a plurality of slave converters and controls them, operates as one inverter/PCS for the upper system. In the degeneration operation, a master that has detected a failure in an inverter/PCS within a system re-distributes and controls the power that has been in charge of the failed slave so as not to cause an increase or decrease in the total power requirement. In the efficiency optimization operation, when the total power requirement is below the maximum ratings for the group of a plurality of inverters/PCSs, the master distributes the electric power amount and reduces the number of operating systems so as to maximize operation efficiency of each of the slaves, and improve inverter efficiency for the entire system.

Furthermore, a synchronous operation is also referred to as power source phase in which a plurality of inverters/PCSs are operated in parallel so as to increase output power. The function of power source phase uses communication to synchronize cross current on alternating current output. (Cross current includes reactive cross current caused by a difference of electromotive force, synchronous cross current caused by a phase difference of electromotive force, and harmonic cross current caused by a waveform difference of electromotive force). Herein, voltage and frequency are essential. Monitoring of frequency is typically performed by using externally provided signal information. The function of frequency monitoring may be integrated from the beginning in designing of the inverter/PCS. Subsequently, master functions control the entire system, by managing own voltage/frequency as well as managing surrounding voltage/frequency for control. In these collaboration between inverters/PCSs, it is not easy to manage an overall system including consumption, power generation, power storage in a specified area of utility companies and consumers. Thus, it is important to collaborate with the EMS and smart meters.

Power station (load dispatching station) generates a large amount of electric power using fuel sources such as thermal or nuclear powers, and supplies power to consumers including industries (commerce and manufacturing) and households via electricity infrastructure such as power transmission and distribution network. As described above, the power transmission and distribution network from the power station to the consumer is generally called electricity infrastructure (utility power system network). Renewable energy provided in electricity infrastructure (PV and wind power generation) creates electric power from energy existing in nature, and like power stations, supplies electric power from the utility power system network via a power transmission and distribution network to consumers. Providing renewable energy in the utility power system network enables operation in view of load on a power station.

Meanwhile, the BESS provided in the electricity infrastructure stores electric power generated by power stations or renewable energy. In the μEMS and SCADA, electric power supplied from power station and renewable energy, and stabilization of entire system including demand power consumed by consumer are controlled by utilizing a power grid and a communication network. It is expected that the μEMS or SCADA performs, for example, stabilization control for an independent utility power system in a remote island/community, stabilization control (ancillary service) for connection with utility power system, control for intermediate voltage and constant voltage for a distribution network, and fluctuation suppression control for BESS/PV/EV.

Effects of installing BESS for a consumer relate with management according to contracted electricity between the consumer and an electric power company (contracted value of maximum power consumption at peak time zone, or contracted value of voltage/frequency at reverse flow power selling of renewable energy). For example, for electric power consumption, if a consumer has consumed electric power that exceeds a contracted electricity, monetary penalty for contract violation is imposed on the consumer from the electric power company. Therefore, a consumer utilizes BESS for management of contracted electricity adopting a peak cut (peak load shaving) for suppressing power consumption (W) during peak periods by utilizing storage of surplus power generated by renewable energy and nighttime power storage, and a peak shift for smoothing overall power consumption (Wh) for a day.

Furthermore, during a reverse flow, failure to perform management that meets prescribed voltage and frequency determined for each company/area leads to monetary penalty for contract breach, to be imposed by the electric power company, for stabilizing the electricity infrastructure. In this case, BESS can also be utilized for suppressing fluctuation due to power generation using renewable energy. Note that electricity rate systems provided by the electric power company include a system that gives preferential treatment in electricity rate according to a power factor. This is mainly for large-volume customers such as commercial and industrial customers. For them, measures are taken for electricity rate discount, for example, based on a calculated average power factor from the amount of active and reactive power for a predetermined period.

Classifying these as a big concept item in individual viewpoints of energy management related to contract between an electric power company and a consumer, will lead to implementation of demand management (peak cut/peak shift) and reverse flow management, in particular, as a control function. In a smart grid as an integrated field of a power grid and a communication network, studies are advancing on a two-way energy management scheme called a demand response, between a utility company (electric power company) and consumers.

Herein, the demand response is described in detail. An important viewpoint shared by an electric power company and a consumer about the demand response is a definition of location of responsibility (location of owner), and a definition of necessary action based on the defined location of responsibility (location of owner). Therefore a technique to implement the demand response can take a plurality of forms according to the location of responsibility. A form in which all responsibility is located on an electric power company is called a direct load control demand response. In this, the consumer has no opportunity of determination; the electric power company directly manages power consumption of the consumer. This is called a direct load suppression contract that is a contract to define a location of responsibility more than just a scheme.

On the other hand, a contract model in which responsibility is located both in an electric power company and a consumer is a negawatt trading demand response. An electric power company inquires of a consumer as to power consumption suppression (for example, in kW), and the consumer attempts suppression of power consumption on a responsibility of the consumer. If the suppression on the consumer has been successful, they obtain monetary incentive from the electric power company, if failed, monetary penalty is caused. On a monetary aspect, it is difficult to provide one definition because there are various electricity conditions and regulations for different countries and areas. Yet there are examples in the Electricity Business Act of Japan, in which an industry (commerce and manufacturing) sets a basic rate (unit rate for 1 kW) for electricity rate to match the highest peak. In demand control, a consumer performs, after understanding the above, suppression control of electric power on one's own convenience in order to reduce the basic rate. Another way to perform two-way communication to exchange suppression of the electric power amount, considering convenience of electric power company in addition to convenience of the consumer, is the demand response.

Therefore, when considering introduction of capital investment on a consumer, there is a certain pattern in estimation (basic rate saving by demand control+additional incentive by the demand response−capital investment cost for energy-saving control>0). Among the basic rate and an electric power amount rate, the basic rate is required to be paid regardless of the amount of use. The demand management (demand control/demand response for peak cut/peak shift) is considered separately as adjustment of demand amount for stabilized power supply from the viewpoint of electric power company and is considered as adjustment of the basic rate from the viewpoint of consumers.

A smart meter provided at an industry (manufacturing and commerce) and a household is used to measure the electric power amount consumed in a facility of the consumer. The measured electric power amount is periodically notified to a management server of an electric power company. The management server is generally called a metering data management system (MDMS). The MDMS is capable of calculating/predicting the total amount of demand power on the consumer. The BESS installed in premises of consumer stores electric power supplied from utility network of electric power company or electric power generated by PV in the premises. The EV stores electric power in vehicle-mounted battery through a battery charger. In industries (commerce and manufacturing), a submeter is provided.

The smart meter is a next-generation power meter that unlike conventional analog induction-type power meter, measures electric power in digital and also has a communication function in a meter. A conventional analog power meter using the principle of the disk of Arago includes inside a current coil and a voltage coil, which operate the measurement disk to generate a rotation force. The power meter has a lot of variations according to operation principle, structure and usage or the like. For a typical household, the power meter that performs integration measurement of active power out of alternating current, including an introduction-type power meter through which an internal rotating disk is visible.

Examples of plurality of types of power meter include an introduction type power meter (electric power amount is indicated by an indicator for each digit, or having additional terminal that generates a pulse signal each time a predetermined electric power amount of power is reached), an inactive power meter, a precision-type combination meter (electronic type having a built-in dynamo-meter, inactive power meter, and watt demand meter, installed at large-volume consumers), and a maximum demand power meter (an electric meter to measure the maximum electric power value in a predetermined time period). On a power meter to be used for dealing as a property of an electric power company, a sealing is attached by the electric power company after installation. On the other hand, the submeter (slave meter) has a similar function as the above-described power meter, however, there are cases where rights and obligations of the owner belong to the electric power company and there are cases where they belong to the consumer. A smart meter having an additional communication function (intelligent function), compared with an analog power meter, can be applied to various services including automatic metering by utilizing the communication function.

Herein, a smart meter will be described in detail. The greatest feature of the smart meter is a function of two-way communication between a utility company (electric power company, water supply/gas company) and a consumer. The smart meter has an intelligent function, as a new trend, of receiving an instruction value from an upper electric power company, in addition to a transmission function with a certain time interval, such as once a day. For example, an electric power company provides the demand response in which, when supply shortage occurs, confirmation is first made toward a customer having advanced understanding and then have the customer request for consumption suppression. In this, monetary incentive is given to the customer who has been cooperative in the demand response. Furthermore, renewable energy including PV has been emerging and the trends of power generation are occurring also in consumers. It is one of important functions of the smart meter to indicate the electricity rate at that time.

The uploaded information transmitted in communication using a smart meter mainly includes consumption amount (various information on consumption amount such as accumulated value and instantaneous value). Frequency of communication is about once in 15 minutes. Whether the information includes prediction of consumption amount (demand) or the like is optionally determined. Typical communication infrastructure includes a relay device called a concentrator/transformer. An optical fiber is used between above-described MDMS and the relay device. For two-way communication from the smart meter to the relay device, both of wired/wireless communication forms are available.

Specifically, there are two types of methods for uploading meter information to the upper MDMS by the smart meter: one way is to deliver the information from an optical fiber network of the utility company to a head end system (HES) via a concentrator (aggregation device). Another way is to perform direct delivery from the smart meter equipped with a wide-area wireless channel to the HES. One concentrator houses a large number of smart meters.

A trading meter among the smart meters is owned by the electric power company. The trading meter can be used such that one trading meter is used for one contract between the electric power company and the consumer, one trading meter is used for one household, or the like. Presuppositions for the trading meters are the same in buildings or factories of industry areas (commerce/manufacturing) as well as in household areas. On the other hand, a submeter is a property of a developer or management owner of a building or a factory. In facilities in an industry area, energy consumption differs according to the difference of location such as a floor or room. Therefore, although calculation used to be performed according to area ratio, there is, however, a problem of how consumption can be grasped correctly in view of energy saving and billing. The submeter is installed near a main facility of a building or of a floor and used for grasping consumption of which section should be managed. The submeter need not always be installed at all locations. There may be a case where the submeter is disposed at a place desirable for the developer or the management owner. For example, consumption management using the submeter is possible, for example, in cases where it is desirable to save electricity but not desirable to stop factory rolling mill which is mission critical in a large factory.

For the trading meter, which is directly linked with billing, high-precision is required. Typical replacement cycle of the trading meter is about 10 years. The submeter performs measurement on a best-effort basis. Thus, precision is at an intermediate level and thus replacement cycle is about several years. It is also possible to integrate into the submeter a wireless communication function and a function to transmit a report/alarm to a centralized control room in a facility so as to utilize the submeter for engineering.

Energy management methods for electricity, gas, and water supply differ according to countries and areas. For example, they are separated in Japan and US but integrated in UK. Typical desires for submeters may include making it with streamlined communication even though management methods are not uniform. In consideration of hardware and software for control and communication, protocols for communication hardware and software may be in the direction of being integrated according to the smart meter. For control, even though there may be a competition for control package to be supplied to customers, if integration is achieved in communication, integration in control will also be achieved by determining a location with a large quantity of services or systems as standard.

In addition to a smart meter, BESS/PV as a new trend of energy system will be further described. As a usage related to BESS on a utility power system of the electric power company, it is expected to utilize BESS so as to implement a function called an ancillary service (short frequency control) that stabilizes the system, by performing output adjustment by time in second according to an instantaneous load fluctuation, in order to maintain the quality of electricity including frequency and voltage of the utility system. A usage related to BESS for consumers including industries and households may be utilization of BESS for achieving a function called a peak shift (daytime operation). Using peak shift, power for a daytime time zone having concentrated power consumption is supplied from the stored night-time electric power which is inexpensive in unit cost. In consideration of BESS, how much charging/discharging should be performed at which timing, for what duration, may be an important element.

For example, in a metaphorical image, electric power W is a faucet, and the amount of power (watthour) Wh is a bucket, meaning a time integration value. The ratio of cost reduction related to investment to BESS has been decreasing year by year. However, the relationship of an incentive due to price difference of electric power between night-time and daytime by BESS, and a payback period with initial cost, is reversed at a time point that exceeds a certain threshold. Even during the payback period, life of the battery is reduced every time BESS performs charging/discharging. Therefore, it is an important viewpoint whether the investment is paid back in total including maintenance cost.

Meanwhile, for PV, due to introduction of feed-in tariff (FIT): fixed price purchase system), it is possible that the payback period by electric power selling incentive with respect to the initial cost will be decreased. PV management may include a centralized electric power control, and a distributed electric power control in which a plurality of PVs are arranged side by side for operation. Furthermore, although a relationship between a scheme of FIT, power generating rate of renewable energy, and rate of purchased electricity from an electric power company differs depending on countries and localities, there may be a form of retail business of electric power (purchasing PV generated power and the power shortage can be bought from an electric power company, and selling surplus electricity). In retailing power obtained from power generation by renewable energy including PV, collaboration with a smart meter may be particularly an important viewpoint. In a conventional energy system, a smart meter (trading meter and submeter), BESS, and PV have emerged as new trends. Installing a communication function and control function onto the smart meters makes it possible to achieve marginless energy solution.

A facility of an electric power company distributes electric power generated by power stations (nuclear power, thermal power, and hydraulic power) to consumers via the electricity infrastructure (utility power system including power transmission and distribution network). A substation is a facility in which voltage and frequency of electricity is converted (conversion of electricity) within a utility power system, and connection and opening/closing of each of the systems are performed. It is also going to be a distribution base of electric power for controlling electric power flow. A substation that handles higher voltage is going to be larger-scale, having larger facility related to transmission cables. In consideration of balancing with cost to build such a facility, an electric power company transmits electricity to the substation that is closest to the power station with the highest voltage. Voltage decreases in sequence as coming closer to a consumer (end consumer).

Each of the stages at which voltage decreases in sequence is called a voltage class. Between each of the voltage classes, a substation corresponding to the class is installed. As an example for one of the areas in Japan, an ultra-high-voltage substation treats voltage of 500-275 kV and storage capacity of 300 MVA, a primary substation treats voltage of 154 kV and storage capacity of 100-150 MVA, secondary substation/power distribution substation treat voltage of 77-66 kV and storage capacity of 60-100 MVA. Arrangement of these substations and scale of facility differ depending on countries and areas.

On the other hand, consumers are classified into special high voltage consumers treating voltage 77-66 kV (building/factory), high-voltage consumers treating voltage 6.6 kV (building/factory), and low-voltage consumers treating voltage 100-200 V (household) or the like. For example, in particular, capacity in a large-scale factory for special high voltage consumers can be 30-60 MVA, which may be a scale of 50% of one power distribution substation. In such a condition, if a consumer has power generating capacity and power storage capacity by introducing PV and BESS, in addition to performing electric power consumption, the consumer will have a great influence in energy management, on a utility company such as an electric power company, according to the trade-off of cost and the scale.

For example, if a consumer introduces PV or BESS having a scale enough to provide electric power to be used for a factory, it is assumed that there will be a change in a system configuration and operation procedures for demand management (peak cut/peak shift) or reverse flow management from an electric power company to the consumer. Specifically, in addition to conventional down-link management from an upper to lower order, that is, from a utility company to a consumer (incentive is given based on a request from the utility company to the consumer), it is possible that there will be additional up-link management from a lower to upper order, that is, from the consumer to the utility company (incentive is given based on a proposal from a consumer to the utility company).

As described above, as a specific form of marginless in an energy area, it is possible to control the consumer from the utility company not by a unit of facility but by a unit of device utilizing a local controller, a smart meter, and a submeter inside the facility. Thereby, it is possible to achieve fine granularity in contract/adjustment and increase accuracy in capital management and capital investment for stabilization of energy supply.

Furthermore, in a manufacturing area, management is classified into an energy management system as a section related to a public business company (electric power company) and a production management system as a section related to a manufacturing owner. In an example of an energy management service, demand management of the electric power amount at components for consumption/generation/storage of power at the end, and power source facility management are performed. Functions of the system using BESS/PV includes frequency control, power factor control, schedule control, monitoring of operation status of a storage battery, control of a system for extended life, distribution (charge/discharge) of optimal instruction value, peak cut/peak shift control, BESS/PV collaboration control (absorption of surplus electric power, reverse flow for power trading). These functions are used to distribute power according to the scale difference, to the upper EMS, local controller, BESS/PV or the like.

For example, if it is a large-scale system, an integrated controller for integrating a plurality of local controllers is provided to collaborate with the upper EMS. In this case, the local controller may be equipped with a part of control functions of EMS so as to enable off-line operation even when communication connection with the upper system is broken.

On the other hand, if it is a small to medium-scale system, part of local controller function may be directly provided on a PCS. For the communication function and control function, since there are cases where the local controller has a subset function of EMS and where the local controller executes as instructed by the upper EMS, various kinds of function distribution schemes are available for individual scales of configuration. For electric power consumption in air conditioning and lighting, performing power consumption control from a viewpoint of energy management, specifically by installing a high-efficiency motor and an inverter as a communication/control function, in consideration of achieving improvement ranging from a single device to a whole system, and further performing collaboration among a plurality of devices, makes it possible to further improve efficiency. Note that information referred to herein includes, if it is information related to electric power, there are a plurality of forms such as a unit of power W, a unit of current A, a unit of voltage V, from a viewpoint of electric power company, consumers, and individual devices.

For water and gas that is energy other than electric power, one possible way is an introduction of cogeneration (combined heat and power) by consumer. Cogeneration is one of energy supply systems that obtains motive power, heat energy, and cool energy by utilizing exhaust heat from internal and external combustion engines, for improving entire energy efficiency. For example, a gas turbine engine system generates steam using exhaust gas from a power-generation gas turbine engine. The steam is efficiently used in production of cool energy in a steam type absorbing refrigerator, or in a facility using steam. Typically, power generation that combines a gas turbine generator and a steam turbine generator is a combined-cycle power generation.

In a gas engine system, steam is produced by an exhaust gas/heat boiler of a power generation gas engine, and tap water is heated with engine coolant and supplied. Furthermore, in a fuel cell system, electricity is generated from hydrogen and oxygen in the air and heat generated as by-product is collected as steam and heated water. Besides, there is a diesel engine system in which exhaust gas and exhaust heat from power generation diesel engine are used as steam generation and heated water supply, and tap water is heated with engine coolant and supplied as heated water. Measuring the electric power, water, gas, and heat quantity by individual meters achieves entire efficiency.

The production management system deals with information other than information of the energy management system. As particular target usages, there are boiler plants and facilities specific to manufacturing plants for steel, electricity and machinery. The local controller performs sequence control (control with programmable logic controller), instrumentation control (control of process automation, analog control of temperature and amount of water or the like), and calculator control, or the like. System requirement differs usage by usage. For example, in a boiler plant, the system can never be stopped. Thus, device replacement at a time of a failure is performed while operating the system, in consideration of high robustness. On the other hand, for a rolling roller in a steel plant, high realtime property is required due to the fact that rotation is matched by measuring tension on each of the motors on a base in a form of sheet of whole length of 100 m.

Components (power electronic devices) will be further described in detail. The components include an electric power consumption device including air conditioning and lighting, an electric generator including PV, and a power storage including BESS. For example, the BESS is configured with a storage battery (battery manager: BMU) and a power converting device. The power converting device is also referred to as an inverter, a converter, or a power conditioning system (PCS), and performs roles of input/output conversion of electric power and adjustment of voltage.

The storage battery (BMU) includes an internal processor for managing an internal state of the battery pack in addition to a plurality of battery cells, and performs charge/discharge control of the electric power based on a request from the PCS. The storage battery (BMU) notifies a control unit of a rated voltage, information including a maximum current value at charge/discharge, a charge rate (state of charge: SOC), and a life-span rate (state of health: SOH).

For example, the PCS exchanges direct-current power with the storage battery and exchanges alternating-current power with utility power system network. The PCS performs direct-current-alternating-current conversion and voltage fluctuation suppression. These functions may also be implemented by a processor externally connected to the device. Control and monitor information between a storage battery (BMU) and a PCS may be implemented using a controller area network (CAN), or using a wired communication medium including Ethernet (registered trademark), or using a wireless communication medium of various frequency bands. Alternatively, the information may be implemented by using an electric signal line specific to each vendor for the product.

Information related to consumption, generation and storage of power can be expressed by the electric power amount represented by unit watt hour (Wh: Watt hour), current quantity represented by unit ampere hour (Ah: Ampere hour), the amount of voltage represented by unit volt hour (Vh: Volt hour), or instantaneous power amount W, or the like. In case of BESS, in constant current charging system that is a typical charging system of the storage battery (BMU), the electric power amount (amount of current) that is input/output by a battery cell in the storage battery (BMU) changes in a fixed condition until SOC represented by percentage reaches a certain threshold. From this, it is known that obtaining SOC value from the storage battery (BMU) enables calculation of chargeable time and dischargeable time corresponding to the information, maximum chargeable/dischargeable electric power, the electric power amount required for charging/discharging (product of chargeable/dischargeable time and electric power). The constant current charging has a property that the amount of current required for charging is minimized after SOC has exceeded a prescribed threshold, making it possible to calculate estimation of information needed for charging/discharging planning.

A communication unit of each of the power electronic devices may be implemented by a wired communication medium including optical fiber, a dedicated line, Ethernet, as a physical communication medium, and a wireless communication medium of 2.4 GHz/5 GHz, and of 920 MHz, or implemented by CAN, RS-232/RS-485, or the like. Various types of standard protocol interface system is installed on the communication medium. In typical BESS, an internal battery cell has a characteristic of performing natural discharge, and notifies a management server of ever-changing SOC or SOH data. In a platform of a backbone system in manufacturing, achieving streamlined ICT various standard between upper and lower systems improves accuracy (estimated value) for control/measurement of energy including electric power (generation, consumption, and storage), gas, and water supply, making it possible to achieve marginless in investment, achievement and management of a facility.

Also in a manufacturing area, there are a viewpoint of energy management as marginless on an electric power company and a viewpoint of production management as marginless on a manufacturing owner. In particular, an index of energy management can be consolidated into a correspondence relation between price and information of electricity/water/gas/heat quantity, whereas the index of production management can be consolidated into the correspondence relation between price and various information required for decision making in production management. Therefore in a production management system, introduction and expansion of a sub-system with respect to configuration of the backbone system, building of a system for collection and analysis (analysis for individual requirements of system efficiency and capital efficiency) for a large amount of data. Hereinafter, description continues, according to the embodiment, by focusing on a sub-system utilized as an additional value to the backbone system in order to advance marginless in acquisition opportunity and acquisition profit and imposition of expenses against management problems in each area. Herein, introduction of a large amount of sensors are assumed.

A manufacturing area includes process manufacturing (manufacturing in which raw material is heated and pressurized to change composition) and factory manufacturing (manufacturing that shifts machining and assembling from manual to automated operation) according to usages of various industrial fields. A device is classified into a device that is directly linked with a manufacturing process in a plant and a device that is not directly linked with the manufacturing process. Control and monitoring functions exist for each of the devices. Examples of the device that is directly linked with a manufacturing process include a programmable logic controller (PLC): a controller for factory manufacturing, a distributed control system (DCS): a controller system for process manufacturing, manufacturing equipment, filling equipment, power equipment (power receiving and transforming, and motive power). These can be positioned as backbone systems. A typical cycle of control/monitoring is per-microsecond to per-millisecond basis.

On the other hand, there are various types of devices that are not directly linked with manufacturing. Examples of these include an actuator, an analyzer, a calibrator, an isolator/signal conversion, a positioner/position estimation, a communication modem/GW device, a loop detector, a flow meter, a pressure gauge, a density meter, a temperature gauge, an input/output (I/O) for various facilities and devices. These devices are typically equipped with a sensor and a function of wireless/wired communication. Hereinafter, a device having a wireless communication function will be referred to as a wireless communication device (wireless device). It is considered that there are various combinations and a large quantity of devices that are not directly linked with manufacturing. Monitoring cycles for these devices differ according to process manufacturing and factory manufacturing, or the like.

Hereinafter, a wireless communication device and a wireless communication system will be described with reference to accompanying drawings. FIG. 1 is a diagram illustrating an exemplary configuration of a wireless communication system 1 according to an embodiment. In the wireless communication system 1, a management server (asset management) 10, a backbone system 12, and a sub-system 2 are connected to each other via a network 100.

The management server 10 manages data in the wireless communication system 1. The backbone system 12 includes devices 120-1 to 120-3 that are directly linked with a manufacturing process. The sub-system 2 includes a gateway (GW) device 20 and wireless communication devices (wireless devices) 22-1 to 22-8. Examples of the wireless communication devices 22-1 to 22-8 include a pressure gauge, a flow meter, an isolator, a calibrator, an analyzer, an actuator, a temperature gauge, and a density meter. Hereinafter, any unspecified device of the wireless communication devices 22-1 to 22-8, for example, may be described in some cases as the "wireless communication device (wireless device) 22" or the like.

Next, examples of prerequisites for the sub-system 2 will be described. Representative examples of process manufacturing include types of industry as petroleum/chemical/steel plants. In this case, the wireless communication device 22 is installed in outdoor environment, and uses a battery-operated power supply with a life demand of several years. The wireless communication device 22 is typically installed in a relatively large-scale network configured with a mesh topology (refer to FIG. 3A).

On the other hand, representative examples of factory manufacturing include types of industry as automobile/electronics/machinery plants. In this case, the wireless communication device 22 is installed in indoor environment, and uses an AC power source as power supply. The wireless communication device 22 is typically provided in a relatively medium-scale network configured with a star topology (refer to FIG. 3B).

Parameters related to the wireless communication device 22, including data size, the minimum update cycle, and the maximum allowable delay time, are managed according to an application executed by the management server 10 or the like. Note that prerequisites for process manufacturing and factory manufacturing that have been indicated herein are only an example. Combinations of parameters for installation environment, power supply, network scale, topology, relay function, data size, the minimum update cycle, and the maximum allowable delay time may understandably vary according to applications in the systems (backbone system/sub-system) including the management server 10 as a center. The present embodiment dynamically corresponds to the varieties of prerequisites and parameters.

Examples of indexes of device management include life property, plasticity, efficiency, responsiveness, precision, and confidentiality. The present embodiment focuses on improvement of the life property, plasticity, efficiency of the wireless communication device 22 and achievement of marginless engineering costs for processes of installation, operation and maintenance. The above-described presuppositions are managed according to the communication path, operation frequency, and power source environment.

Figure 2:
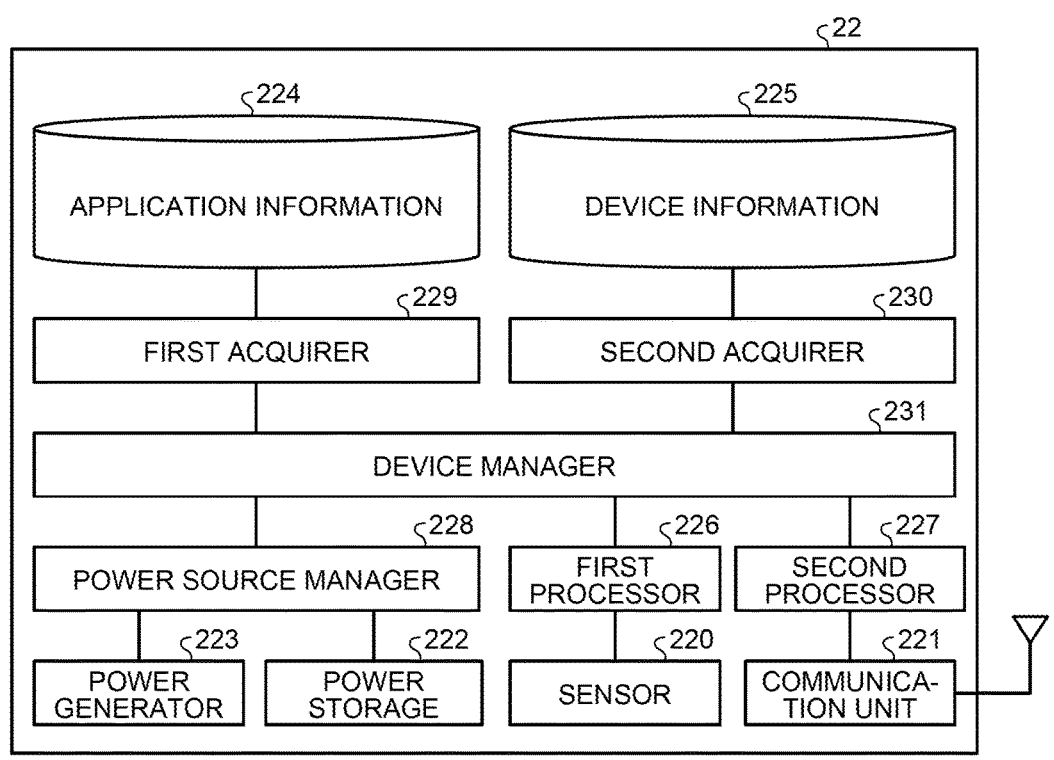
FIG. 2 is a schematic diagram illustrating an exemplary configuration of the a wireless communication system according to an embodiment.

FIG. 2 is a diagram illustrating a schematic exemplary configuration of the wireless communication device 22 in an embodiment. The wireless communication device 22 includes, for example, a sensor 220, a communication unit 221, a power storage 222, a power generator 223, a first memory unit 224, a second memory unit 225, a first processor 226, a second processor 227, a power source manager 228, a first acquirer 229, a second acquirer 230, and a device manager 231.

The sensor 220 is a sensor that detects, for example, light, sound, temperature, pressure, electricity, magnetism, distance, speed. The communication unit 221 wirelessly communicates with the other wireless communication device 22 or the GW device 20 and transmits, for example, data that corresponds to results detected by the sensor 220, to the management server 10 or the like. Note that the communication unit 221 may be configured so as to perform wired communication.

The power storage 222 is, for example, a secondary battery (storage battery) that stores electric energy and may be a power source that has been optimized in capacity with respect to the wireless communication device 22. The power generator 223 generates electricity by converting, for example, optical, thermal, vibrational, or magnetic energy, to an electrical energy (application of energy harvesting).

The first memory unit 224 is configured, for example, with a memory and stores application information related to an application executed by the management server 10 or the like. The second memory unit 225, is configured, for example, with a memory and stores information (device information) related to operation of the wireless communication device 22.

The first processor 226 processes, for example, input/output of a result that has been detected by the sensor 220. The second processor 227 performs processing related to the wireless communication performed by the communication unit 221. The power source manager 228 manages the power storage 222 and the power generator 223. In particular, the power source manager 228 causes, for example, the electric power that has been generated by the power generator 223 to be stored in the power storage 222, and manages a stored electric power amount (remaining capacity) in the power storage 222.

The first acquirer 229 obtains the application information stored in the first memory unit 224, and outputs the application information to the device manager 231. The application information includes, for example, patterned (associated with cycle) operation timing (first information) for which the management server 10 manages data. Specifically, the application information includes the amount of data received and managed by the management server 10, first time information that indicates time to be a reference of communication with the management server 10.

The second acquirer 230 obtains the device information stored in the second memory unit 225, and outputs the information to the device manager 231. The device information includes the stored electric power amount (second information) whose remaining capacity changes according to the operation of the wireless communication device 22. Specifically, the device information includes electric power supply information that indicates an electric power supply amount that increases the stored electric power amount supplied from the power generator 223, power consumption information that indicates power consumption amount the wireless communication device 22 consumes according to the operation, and second time information that indicates the time to be the reference for the communication with the other wireless communication device 22.

The device manager 231 includes a CPU, a memory, or the like, and executes a program to control individual units that configure the wireless communication device 22. The device manager 231 controls, for example, generated-power information and power source/remaining capacity information related to power source management, and power consumption information related to communication processing and sensing processing.

The device manager 231 may be configured so as to determine controllability of the wireless communication device 22 itself. Herein, controllability represents, for example, a capability of matching communication method and granularity of data in response to an inquiry by communication and a capability of responding to this inquiry by communication. Determination of controllability may be performed in such a method that the management server 10 that determines the life property that indicates whether the stored electric power amount in the wireless communication device 22 has remaining capacity enough for operation, dynamically inquires the wireless communication device 22. For another method, it is also possible to set a fixed parameter at shipping. In case of a method using a dynamic inquiry, there may be forms of request/response (normal), request/response (abnormal), and request/no response. Herein, normal means a case where types of function, types of information, granularity of information, assumable by an inquirer, have matched. Abnormal means a case where the above conditions have not matched, or no response has been returned from the device to which the inquiry has been sent. It is possible that the wireless communication device 22 actively sends a notification.

Figure 3B:
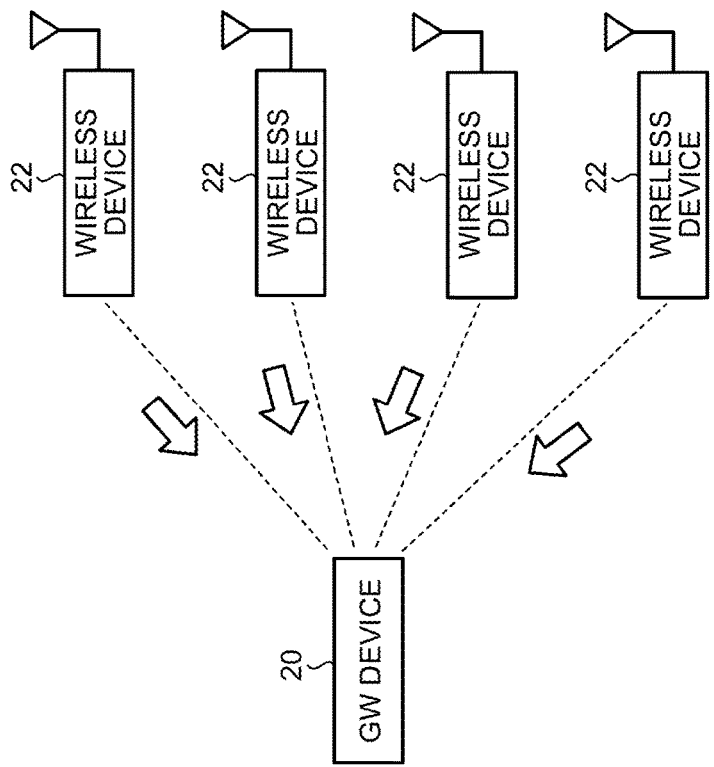
FIGS. 3A and 3B illustrate examples of communication path between a plurality of wireless communication devices in a sub-system.
Figure 3A:
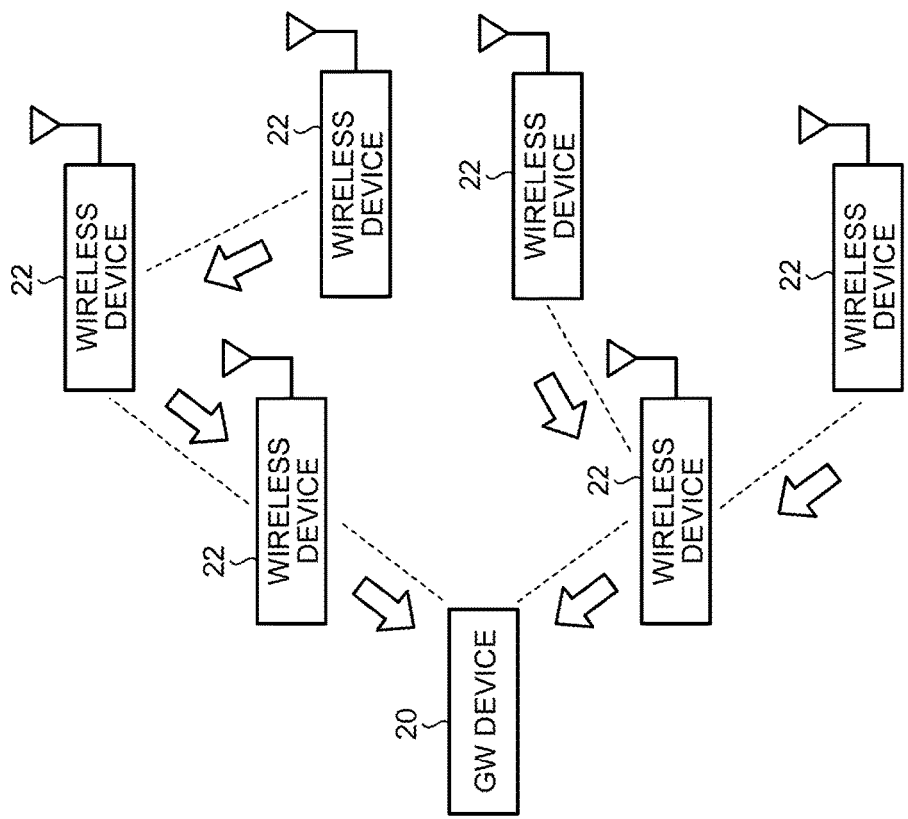

FIG. 3 is a diagram illustrating an exemplary communication path between a plurality of wireless communication devices 22 in the sub-system 2. FIG. 3A illustrates a mesh communication path. FIG. 3B illustrates a star communication path. The wireless communication device 22 has any function of a transmitter, relay device, receiver, according to a combination of network scale, topology, and relay function. The GW device 20 typically has a function of connecting the sub-system 2 to a system in which the management server 10 has been installed, by using wired/wireless communication.

The wireless communication performed by the wireless communication device 22 does not depend on a specific method. Even with this, an outline of IEEE 802.15.4 designed for power saving in a medium access control (MAC) layer and a physical (PHY) layer will be described, for example. IEEE 802 is a committee that establishes standards for a local area network (LAN) or the like, within the Institute of Electrical and Electronic Engineers (IEEE) that is an association for academic professionals involved in the electrical and electronic fields. Among this, IEEE 802.15.4 defines standards for the MAC and the PHY layers for supplying services of low power consumption/low-speed transmission. IEEE 802.15.4 defines the PHY and MAC layers. The PHY layer uses bands of 868 MHz, 902 MHz, and 2.4 GHz, each of is used for achieving transmission speed up to 20 kbps, 40 kbps, and 250 kbps, respectively. The MAC layer performs communication control using time division multiple access (TDMA) or carrier sense multiple access (CSMA).

Furthermore IEEE 802.15.4 has established IEEE 802.15.4e that is an expanded specification of the MAC layer in order to meet various specific requirements mainly in the manufacturing area. As the expansion of the MAC layer, time slotted channel hopping (TSCH), a low latency deterministic network (LLDN), and deterministic & synchronous multichannel extension (DSME), or the like, have been defined.

The TSCH defines the expanded specification focusing on power saving and life property expansion of the wireless communication device. In a conventional non-synchronous network, for example, time synchronization is not performed between the wireless communication devices. Due to this, it has not been possible to control communication timing with the lower node. Therefore, the wireless communication device functioning as a relay always had to be operating, making it difficult to maintain battery life of several years or more under a condition that does not permit a sleeve state. The TSCH, on the other hand, performs synchronization between the wireless communication devices and performs an intermittent-type operation so as to achieve power saving in communication. The TSCH also defines a high-efficient communication specification for preventing electric wave interference in a specific channel. As described above, the wireless communication device 22 in an embodiment is capable of using a communication unit in consideration of power saving such as IEEE 802.15.4/IEEE 802.15.4e, whereas the device does not depend on a specific method.

Figures 4, 5:
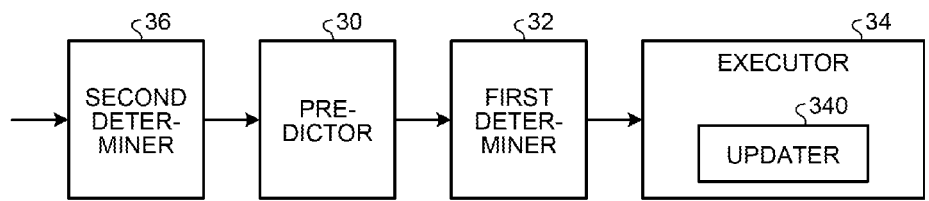
FIG. 4 is a functional block diagram illustrating an outline of functions of a device control unit.
FIG. 5 is a chart related to control/monitoring data in an application of a management server.

Next, functions of the device manager 231 will be described in detail. FIG. 4 is a functional block diagram illustrating outline of functions of the device manager 231. The device manager 231 includes a predictor 30, a first determiner 32, an executor 34, and a second determiner 36.

The predictor 30 predicts a change in the stored electric power amount in the power storage 222 for a predetermined period, based the application information (first information) and the device information (second information). The first determiner 32 determines, based on a prediction result by the predictor 30, whether the wireless communication device 22 is capable of continuing operation using stored electric power in the power storage 222 until a predetermined period has elapsed (for a predetermined period). Specifically, the first determiner 32 determines that the wireless communication device 22 is capable of continuing operation using stored electric power in the power storage 222 when the stored electric power amount in the power storage 222 that has been predicted by the predictor 30 exceeds a predetermined threshold.

The executor 34 is equipped with, for example, an updater 340. When a patterned operation (operation pattern) is updated by the updater 340 according to an application, it is possible to cause the wireless communication device 22 to execute a different operation. When the first determiner 32 has determined that the wireless communication device 22 is capable of continuing operation, for example, the executor 34 executes a first operation pattern so that data is received and transmitted between the GW device 20, other wireless communication device 22, or the like and the management server 10 via the wireless communication device 22. Furthermore, when the first determiner 32 has determined that the wireless communication device 22 is not capable of continuing operation, for example, the executor 34 executes a second operation pattern in which the wireless communication device 22 moves into an intermittent operation. At the same time, the executor 34 executes a third operation pattern for causing the other wireless communication device 22 or the like to change the communication path such that the other wireless communication device 22 may transmit data to the management server 10 without passing through the wireless communication device 22.

The second determiner 36 determines whether it is possible to cause the wireless communication device 22 or the like to change the communication path by the above-described third operation pattern. When the other wireless communication device 22 is a device that is not capable of performing a dynamical operation pattern change, for example, the second determiner 36 determines it is not possible to cause the other wireless communication device 22 to change the communication path. The executor 34 executes the above-described third operation pattern when the second determiner 36 has determined that it is possible to cause the wireless communication device 22 to change the communication path.

Next, operation of the wireless communication system 1 will be described in detail. FIG. 5 is a chart illustrating exemplary types of operation frequency related to control/monitoring data in application of the management server 10 FIG. 6 is a chart illustrating the operation frequency related to control/monitoring data in an application of the management server 10. In the backbone system 12 and the sub-system 2, the monitoring data includes, for example, data related to each of the setting and re-setting for the wireless communication device 22, data related to diagnostic result for the wireless communication device 22, data related to trouble-shooting of the wireless communication device 22, data related to various measurement values supplied by the wireless communication device 22, and data related to integrity and status of the wireless communication device 22. Various data have their own presuppositions including data length, periodicity (periodic/non-periodic). These are fixedly embedded at ordinary implementation and designing.

FIG. 7 is a chart illustrating an exemplary role in wireless communication path/operation timing, power consumption amount or the like for each of the types of power sources, related to the life property of the wireless communication device 22. Power consumption amount of the wireless communication device 22 is generally calculated theoretically according to the predetermined operation of the sensor 220 and the communication unit 221. Alternatively, they are calculated using a statistic value based on a past performance.

The power consumption in the communication unit 221 varies in each of the states of sleeping, waiting, and operating (transmission and reception processing). A generated electric power amount as illustrated in FIG. 7, may be an example of application of energy harvesting (environmental power generation: scheme for obtaining driving electric power on a non-utility basis by harvesting energy from solar light, illumination light, vibration of machine, heat. In view of the life property of the sub-system 2, the electric power amount associated with operation timing is important. In this case, the electric power is classified into consumed power, generated power, and stored power.

FIG. 8 is a chart illustrating parameters related to each of the devices (the wireless communication device 22, the GW device 20, the management server 10, and a device 120). Parameters related to the backbone system 12 and the sub-system 2 in the manufacturing area characteristically involve across a plurality of layers (from an application layer to a device management area layer) of the plurality of devices. Each of the parameters for the wireless communication device 22 and the GW device 20 is included in the device information. Each of the parameters for the management server 10 and the device 120 is included in the application information.

In consideration of the sub-system 2 after installation of the wireless communication device 22 (sensor device) as a way to expand a scope of data utilization with respect to the backbone system 12 that achieves applications in various areas including energy, industry, health care, public, and traffic, expanding the life property of the wireless communication device 22 is important in that it contributes to achieving marginless in costs for operation and maintenance processes. In an actual system, the upper-system management server 10 and the lower-system wireless communication device 22 may be configured with multi-vendor products (products and systems from a plurality of vendors). In this case, whether it is appropriate to perform an operation update after starting of the operation, and granularity of data differs depending on implementation in HW/SW (Hardware/Software). In this case, it is allowable to set treating the identical behavior from the upper-system to the lower-system and identical granularity data, and fixedly embedding parameters at a time of designing before starting installation, operation, and maintenance, as prerequisite.

Figure 9:
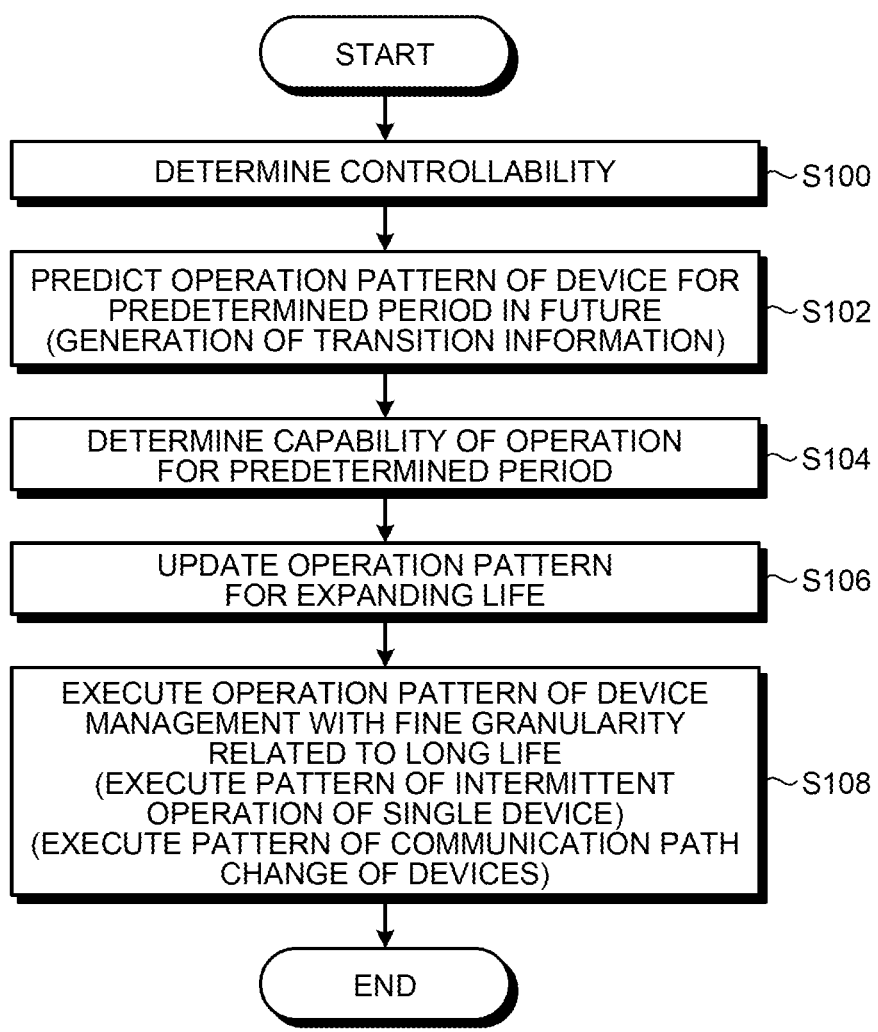
FIG. 9 is a flowchart illustrating an operation algorithm executed by a wireless communication device according to an embodiment.

FIG. 9 is a flowchart illustrating an operation algorithm executed by the wireless communication device 22. In the wireless communication system 1, the wireless communication device 22 executes an operation algorithm illustrated in FIG. 9 by the device manager 231, and determines controllability of a cooperative operation between the upper management server 10 and the lower wireless communication device 22. If it is determined that the wireless communication device 22 has controllability, the wireless communication device 22 determines whether it is possible to continue the operation of the wireless communication device 22, as prediction information on a future operation pattern for a predetermined time from the management server 10, by using the application information in the management server 10 and the device information in the wireless communication device 22.

Specifically, the device manager 231 determines controllability of a cooperative operation in the management server 10 and the wireless communication device 22 (S100).

Next, the device manager 231 predicts operation pattern of the wireless communication device 22 for a predetermined period in the future, by using the application information of the management server 10 and the device information of the wireless communication device 22 (S102). Here, the device manager 231, referring to operation timing information on the management server 10 and the wireless communication device 22, generates transition information on stored electric power amount in the power storage 222.

Then, the device manager 231 compares, for example, the stored electric power amount (remaining capacity) in the power storage 222 with a predetermined threshold, and determines whether the wireless communication device 22 (any of components of the wireless communication system 1) is capable of performing operation (driving) for a predetermined period by using the power storage 222 (S104).

Next, the device manager 231 updates the operation pattern such that the wireless communication device 22 (namely, any of components of the wireless communication system 1) expands its life (S106).

Thereafter, the device manager 231 executes an operation pattern of the device management with fine granularity, related to long life of the wireless communication device 22 (namely, any of components of the wireless communication system 1) (S108). In particular, the device manager 231 executes an intermittent operation pattern (second operation pattern) of the single wireless communication device 22. At the same time, the device manager 231 executes a pattern (third operation pattern) to change the communication path (path of a plurality of devices) for the wireless communication device 22.

Here, determination of controllability will be described. When controllability exists in an embodiment, types of function, types of information and granularity of information match in a predetermined range between the management server 10 and the wireless communication device 22. Types of function indicates indexes of, for example, the life property, plasticity, efficiency, responsiveness, precision and confidentiality.

The life property includes, for example, a function for allowing the wireless communication device 22 to perform intermittent-type operation among sleeping/waiting/operating modes, and a function to switch communication paths between a plurality of wireless communication device 22 so as to prevent concentration of processing load and power consumption to a particular wireless communication device 22. These functions are considered as measures for allowing the sub-system 2 including the battery-operated wireless communication device 22 to operate as the entire wireless communication system 1 for a long period.

Plasticity includes a function to perform intensive communication processing when the management server 10 determines it is necessary, or during a period that includes the case where notification of control/monitoring data to the upper order is possible, in the operation of the wireless communication device 22, so as to prevent occurrence of unnecessary communication except for the predetermined period. That is, control and monitoring are not constantly performed at a fixed processing frequency. In the above-described example, the data the wireless communication device 22 transmits to the management server 10 is not always updated. It is updated based on an even including failure and process/condition of the device. As described above, plasticity includes causing data collection to be linked with the state of application based on a specific event.

Efficiency may involve with a function to improve efficiency in data communication. Application, for example, related to various ICT standard used by the wireless communication system 1, to the wireless communication device 22, possibly includes messaging protocol, and data format such as extensible markup language (XML). Typically, the XML is not easily applied to a built-in apparatus such as the wireless communication device 22, according to data amount. Therefore, it is possible to assume utilization of efficient XML interchange (EXI: a series of specification for efficiently representing XML document in a non-text format (binary)). With the EXI, it is possible to perform data compression using high-efficiency encoding. It is, however, required to install encoder/decoder function on each of the management server 10 and the wireless communication device 22.

Responsiveness is a function to update priority of a particular data processing according to application. Precision is a function to synchronize time for the wireless communication system 1 including the management server 10 and the wireless communication device 22 so as to ensure consistency of data. Confidentiality is a function of security including secrecy, integrity, and authenticity. Functions can be combined appropriately in an embodiment rather than using one specific function.

In comparison with the above types of functions, types and granularity of information involve with expression formats of data information actually exchanged between the management server 10 and the wireless communication device 22. Hereinafter, in an embodiment, types and granularity of information related to the life property function. In this, controllability is determined to exist if types and granularity of information needed for executing the function meet a predetermined conditions.

Figure 10:
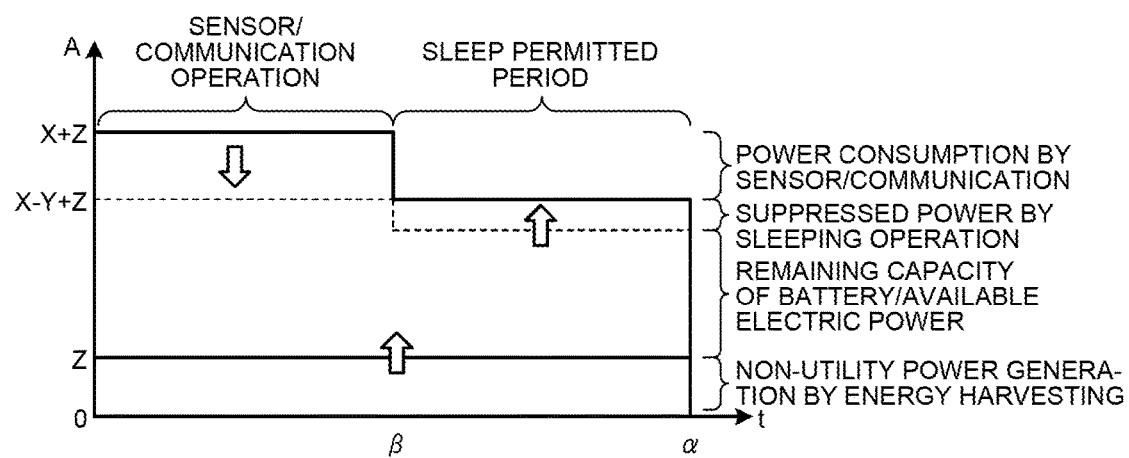
FIG. 10 is a diagram illustrating types and granularity of various information related to functions of the life property.
Figure 11:
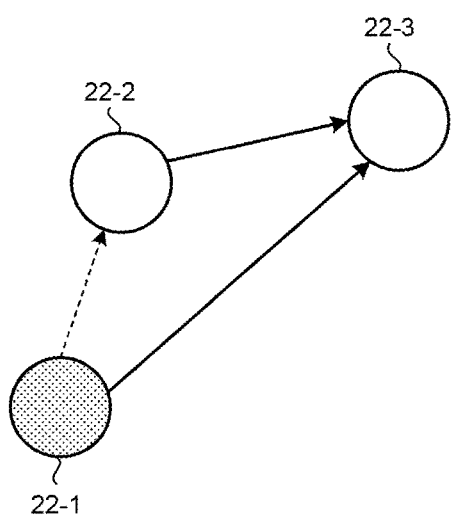
FIG. 11 is a schematic diagram illustrating operation pattern determination and update results based on various information.

FIG. 10 is a diagram illustrating types and granularity of various information related to functions of the life property. FIG. 11 is a schematic diagram illustrating operation pattern determination and update results based on various information indicated in FIG. 10. Determination and update of operation may be executed by the wireless communication device 22 in one form or may be instructed by the management server 10 in another form.

Herein, the vertical axis in FIG. 10 corresponds to the amount of current represented with ampere/hour (Ah: Ampere hour), for example. The horizontal axis corresponds to the time. Herein, X corresponds to the amount of current, for example, for the electric power stored in the power storage 222. Y corresponds to the amount of current, for example, for the power consumption consumed by the wireless communication device 22 in data transmission or the like. Z corresponds to the amount of current, for example, for the amount of electricity generated by the power generator 223.

As described earlier on the power storage 222 in an embodiment, constant current charging as one of the common charging method for the storage battery has a property that the amount of current needed for charging is minimized after the state of charge (SOC) exceeds a predetermined threshold. Accordingly, future operable time can be estimated based on remaining capacity of the storage battery and the power consumption amount.

In FIG. 10, β represents operation time for communication processing and sensing processing. α represents a predetermined range of time determined by the management server 10 or the wireless communication device 22. The area expressed by integration of X and time represents the electric power amount available at that time, as the amount that is not used for power consumption or generation. The area expressed by integration of Y and time represents the power consumption amount for communication processing and sensing processing. The area expressed by integration of Z and time represents a non-utility generated electric power amount using energy harvesting.

The wireless communication device 22 determines that the wireless communication device 22 (the wireless communication system 1) is operable when the amount of remaining capacity of battery/available electric power amount exceeds a predetermined threshold for a predetermined period (a in FIG. 10). Alternatively, when the above amount does not exceed the threshold, the wireless communication device 22 moves to the determination of update of operation pattern that expands the life of the wireless communication device 22 (the wireless communication system 1).

When priority is placed on application processing for the management server 10 rather than life property improvement processing, power saving operation is not performed during the period of time β to be used for communication processing and sensing processing, among the entire predetermined time α. On the contrary, when priority is placed on the life property improvement processing rather than the application processing, power saving operation is performed for the time period β, corresponding to the remaining capacity of battery and the amount of electric power available. Execution of operation pattern for device management with fine granularity related to power saving includes execution of an intermittent operation pattern (second operation pattern) of the single wireless communication device 22 and execution of path-change pattern (third operation pattern) of a plurality of devices.

The wireless communication device 22-2, as illustrated in FIG. 11, for example, executes the intermittent operation pattern (second operation pattern), and changes the communication path on which the wireless communication device 22-1 has been transmitting data to the wireless communication device 22-3 via the wireless communication device 22-2, to the communication path on which the data is transmitted from the wireless communication device 22-1 directly to the wireless communication device 22-3.

Figure 12:
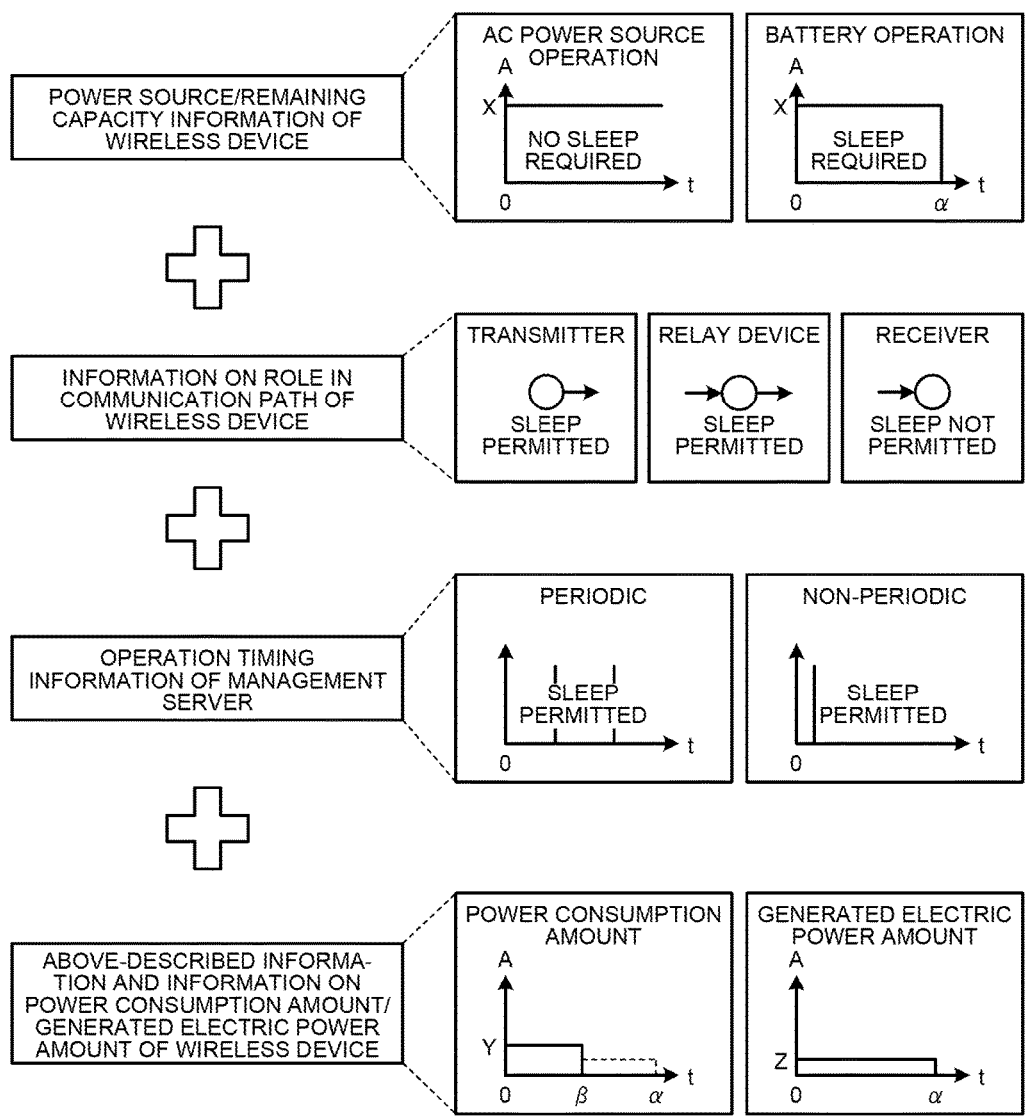
FIG. 12 is a schematic diagram illustrating information required for determination.

FIG. 12 is a schematic diagram illustrating information required for determination that has been described in FIGS. 10 and 11. Specific information needed for performing determination and operation described in FIGS. 10 and 11 includes: power source/remaining capacity information of the wireless communication device 22, information on the role of the wireless communication device 22 in the communication path, operation timing information of the management server 10, and information on the power consumption amount and the generated electric power amount of the wireless communication device 22, based on these information.

Information on power source/remaining capacity is information on the electric power amount that is available in a predetermined period from each of AC power source operation and battery operation. Information on the role in the communication path is information of the transmitter, the relay device, and the receiver. In a typical mesh network, it is difficult for the relay device to move to the sleeping state. It is possible to consider, however, application of sleeping control corresponding to logical priority rank of the relay device as has been defined in IPv6 routing protocol for low-power and lossy networks (RPL). Information on operation timing of application of the management server 10 corresponds to the above-described data length (amount) and processing frequency. Besides this, the information includes maximum allowable delay time. The power consumption amount for communication processing can be calculated based on the above information and properties including physical distance during data transmission/reception among each of the wireless communication devices 22 (A to I), and operation states (transmission processing and reception processing).

Figure 13:
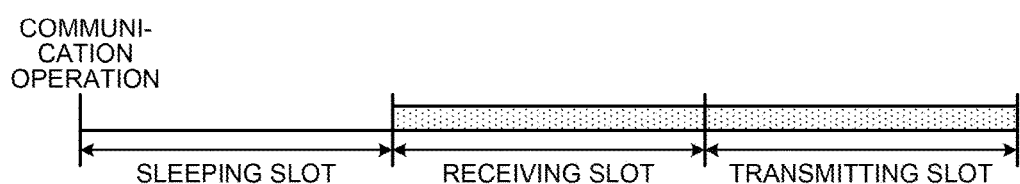
FIG. 13 is a diagram illustrating intermittent operation of a single wireless communication device.

FIG. 13 is a diagram illustrating the intermittent operation of the single wireless communication device 22. The intermittent operation of the single wireless communication device 22 is an intermittent-type communication operation with finer granularity as observed in TSCH, and manages a sleeping slot, reception slot, and transmission slot, with division.

Figure 14:
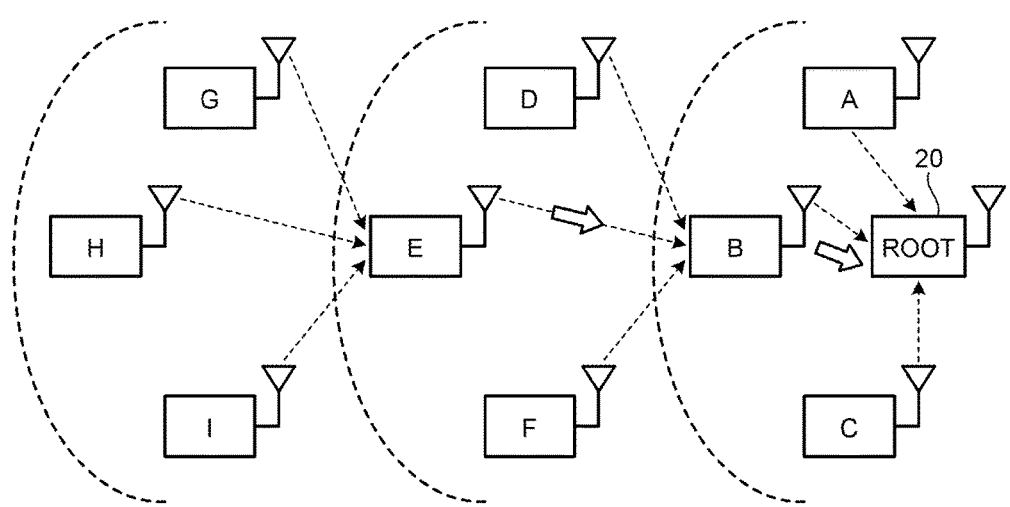
FIG. 14 is a diagram illustrating operation to change a communication path of a wireless communication device according to an embodiment.

FIG. 14 is a diagram illustrating operation to change a communication path of the plurality of wireless communication device 22. Path change for the plurality of wireless communication device 22 is performed to prevent concentration of load on a particular wireless communication device 22, in data distribution from the transmitter to the receiver. When this operation is applied, the management server 10 or the wireless communication device 22 obtains information described in FIG. 12, for the plurality of wireless communication device 22, and performs determination.

FIG. 15 is a diagram illustrating an exemplary mutual relationship among the wireless communication device 22-1, the wireless communication device 22-2, the GW device 20, the management server 10, and the device 120, and the operation sequence in the wireless communication system 1. First, the wireless communication system 1 determines controllability of each of the devices (the wireless communication device 22-1, the wireless communication device 22-2, the GW device 20, the management server 10, and the device 120) (S200).

Subsequently, the wireless communication system 1 obtains the application information on the backbone system 12, the device information on the sub-system 2 (S202), and the wireless communication device 22-1, the wireless communication device 22-2, the GW device 20, and the management server 10 obtain the application information (S204).

Each of the wireless communication device 22-1, the wireless communication device 22-2, and the GW device 20 predicts an operation pattern (S206), and updates each of the operation patterns (S208). Next, the wireless communication device 22-1, the wireless communication device 22-2, and the GW device 20 update a common operation pattern (S210), and execute an updated operation pattern (S212). Thereafter, the wireless communication system 1 performs communication of control/monitoring data for extending life between the management server 10 and the wireless communication device 22 (S214).

As described above, the wireless communication device 22 executes the first operation pattern in which the wireless communication device 22 transmits data between the other communication device and the management server 10 when the first determiner 32 has determined it is possible to continue operation. When the first determiner 32 has determined that it is not possible to continue operation, the wireless communication device 22 executes the second operation pattern in which the wireless communication device 22 moves into intermittent operation. At the same time, the wireless communication device 22 executes the third operation pattern that causes the other communication device to change the communication path so that the data can be transmitted from the other communication device to the management server 10 without passing through the wireless communication device 22. Therefore, it is possible to efficiently extend the life of entire wireless communication system 1 including the wireless communication device 22 operated by the power storage 222. Operation performed by the wireless communication device 22 to extend the entire life of the wireless communication system 1 may be performed by other devices such as the management server 10.

The wireless communication device 22 may be implemented by using, for example, a general-purpose computer device as basic hardware. That is, the wireless communication device 22 may be implemented by causing a processor installed in the above-described computer device to execute a program. At this time, the wireless communication device 22 may implemented by installing the above-described program in the computer device in advance. Alternatively, the program may be stored in a storage medium such as CD-ROM, or may be distributed via a network to be installed appropriately in a computer device so as to implement the device. The wireless communication device 22 may also be implemented by using a memory that is built in a computer device or provided externally, or by using a storage medium such as a hard disk.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device comprising:
   a first memory;
   a second memory; and
   circuitry,
   the first memory being configured to store therein first information that includes a cycle of collecting data from the wireless communication device by a management server,
   the second memory being configured to store therein second information that includes a stored electric power amount in which remaining capacity changes according to operation of the wireless communication device,
   the circuitry being configured to
      determine whether the wireless communication device is able to continue operation by the stored electric power for a predetermined period, based on the first information stored in the first memory and the second information stored in the second memory,
      execute a first operation pattern in which the data is transmitted and received between a second wireless communication device and the management server via the wireless communication device when it is determined that the wireless communication device is able to continue the operation by the stored electric power, and
      execute a second operation pattern and a third operation pattern when it is determined that the wireless communication device is not able to continue the operation by the stored electric power, wherein
   the second operation pattern is an operation pattern in which the wireless communication device moves into intermittent operation, and
   the third operation pattern is an operation pattern in which the wireless communication device causes the second wireless communication device to change a first communication path to a second communication path, the first communication path being a path on which data is transmitted from the second wireless communication device to the management server via the wireless communication device, the second communication path being a path on which data is transmitted from the second wireless communication device to the management server without passing through the wireless communication device.

2. The device according to claim 1, wherein
the circuitry is further configured to determine whether the second wireless communication device can change the communication path of the data in the third operation pattern, and
the circuitry executes the third operation pattern when it is determined that the second wireless communication device can change the communication path of the data.

3. The device according to claim 1, wherein
the first information includes an amount of data received and managed by the management server, and first time information that indicates time to be a reference of communication with the management server, and
the second information includes electric power supply information that indicates an electric power supply amount for increasing the stored electric power amount supplied from a power source, power consumption information that indicates a power consumption amount consumed by the wireless communication device according to operation, and second time information that indicates time to be a reference for the communication with the second wireless communication device.

4. The device according to claim 1, wherein
the circuitry is further configured to predict a change in the stored electric power amount for the predetermined period, based on the first information and the second information, and
the circuitry determines that the wireless communication device is able to continue the operation using the stored electric power when the predicted stored electric power amount exceeds a predetermined threshold.

5. A wireless communication system comprising:
   a management server configured to manage data; and
   a wireless communication device configured to operate by stored electric power so that data is transmitted and received between a second wireless communication device and the management server via the wireless communication device, wherein
   the wireless communication device includes
   a first memory, a second memory, and circuitry,
   the first memory being configured to store therein first information that includes a cycle of collecting data from the wireless communication device by the management server,
   the second memory being configured to store therein second information that includes a stored electric power amount in which remaining capacity changes according to operation of the wireless communication device, the circuitry being configured to determine whether the wireless communication device is able to continue operation by the stored electric power until a predetermined period has elapsed, based on the first information stored in the first memory and the second information stored in the second memory, execute a first operation pattern in which the data is transmitted and received between the second wireless communication device and the management server via the wireless communication device when it is determined that the wireless communication device is able to continue the operation by the stored electric power, and execute a second operation pattern, in which the wireless communication device moves into intermittent operation, and a third operation pattern when it is determined that the wireless communication device is not able to continue the operation by the stored electric power, the third operation pattern causing the second wireless communication device to change a first communication path to a second communication path, the first communication path being a path on which data is transmitted from the second wireless communication device to the management server via the wireless communication device, the second communication path being a path on which data is transmitted from the second wireless communication device to the management server without passing through the wireless communication device.

6. The system according to claim 5, wherein
the circuity is further configured to determine whether the second wireless communication device can change the communication path of the data in the third operation pattern, and
the circuitry executes the third operation pattern when it is determined that the second wireless communication device can change the communication path of the data.

7. The system according to claim 5, wherein
the first information includes an amount of data received and managed by the management server, and first time information that indicates time to be a reference of communication with the management server, and
the second information includes electric power supply information that indicates an electric power supply amount for increasing the stored electric power amount supplied from a power source, power consumption information that indicates a power consumption amount consumed by the wireless communication device according to operation, and second time information that indicates time to be a reference for the communication with the second wireless communication device.

8. The system according to claim 5, wherein
the circuitry is further configured to predict a change in the stored electric power amount for the predetermined period, based on the first information and the second information, and
the circuitry determines that the wireless communication device is able to continue the operation using the stored electric power when the predicted stored electric power amount exceeds a predetermined threshold.

* * * * *